Figure 1:
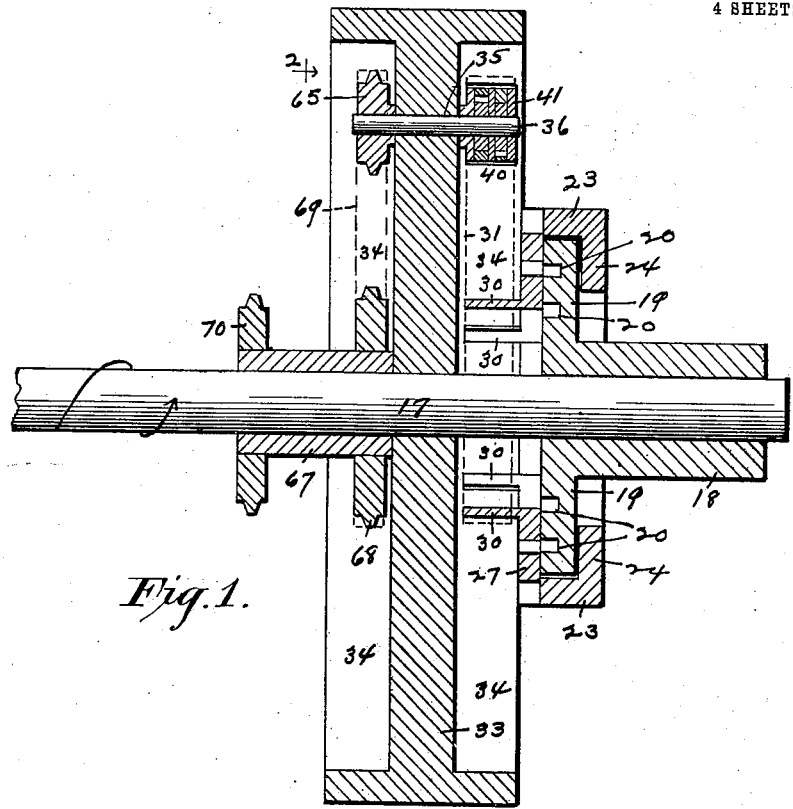

E. M. & W. J. STEINLE.
VARIABLE SPEED AND REVERSING MECHANISM.
APPLICATION FILED FEB. 24, 1908.

980,847.

Patented Jan. 3, 1911.
4 SHEETS—SHEET 1.

Witnesses.
W. N. Hull.
W. S. Sargent.

Inventors.
E. M. Steinle
W. J. Steinle
By O. K. Trigo
atty.

E. M. & W. J. STEINLE.
VARIABLE SPEED AND REVERSING MECHANISM.
APPLICATION FILED FEB. 24, 1908.

980,847.

Patented Jan. 3, 1911.
4 SHEETS—SHEET 2.

Witnesses.

Inventors.

E. M. & W. J. STEINLE.
VARIABLE SPEED AND REVERSING MECHANISM.
APPLICATION FILED FEB. 24, 1908.
980,847.
Patented Jan. 3, 1911.
4 SHEETS—SHEET 3.
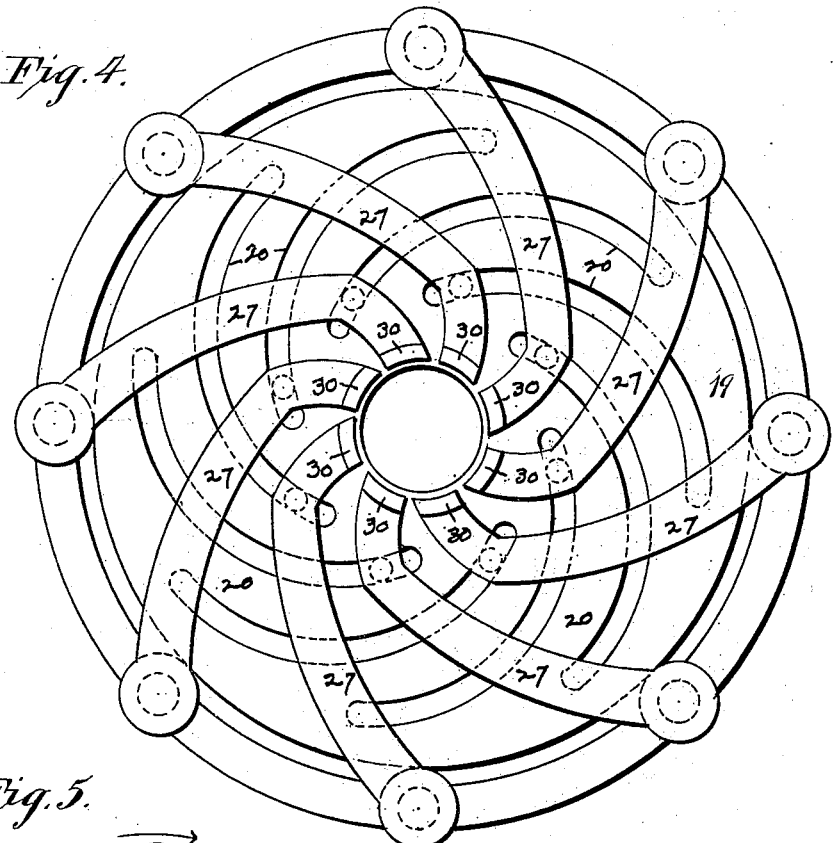
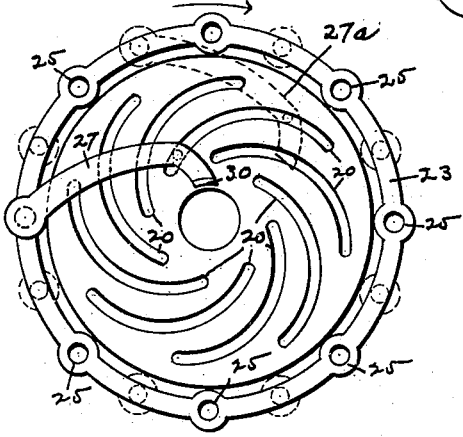
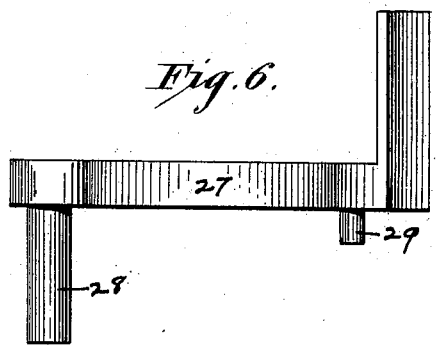
Witnesses
Inventors E. M. & W. J. STEINLE.
VARIABLE SPEED AND REVERSING MECHANISM.
APPLICATION FILED FEB. 24, 1908.

980,847.

Patented Jan. 3, 1911.

4 SHEETS—SHEET 4.

Witnesses.

Inventors.
E. M. Steinle
W. J. Steinle
By O. K. Trigo
Atty.

UNITED STATES PATENT OFFICE.

EDWARD M. STEINLE AND WILLIAM J. STEINLE, OF CHICAGO, ILLINOIS.

VARIABLE-SPEED AND REVERSING MECHANISM.

980,847. Specification of Letters Patent. Patented Jan. 3, 1911.

Application filed February 24, 1908. Serial No. 417,229.

*To all whom it may concern:*

Be it known that we, EDWARD M. STEINLE and WILLIAM J. STEINLE, citizens of the United States, residing at Chicago, in the county of Cook and State of Illinois, have invented certain new and useful Improvements in Variable-Speed and Reversing Mechanism, of which the following is a specification.

Our invention relates to improvements in variable speed and reversing mechanism comprising: a main shaft having a bearing provided at one end with a circular plate having curved grooves formed in its inner face, a rotatable flanged ring surrounding said plate, radial arms having their outer ends hinged to said ring and provided between their ends with pins slidably arranged in said grooves and having on their inner ends fingers extending parallel with the shaft and forming a non-rotatable expansion pulley rim encompassing said shaft, means for partially rotating said ring and for expanding said non-rotatable pulley, a fly wheel secured on the shaft adjacent to the non-rotatable pulley and provided near its rim with an opening, a rotatable axle arranged in said opening, a planetary expansion pulley secured on one end of said axle and carrying a belt traveling on said non-rotatable pulley and provided with swinging spokes each carrying a section of the pulley rim on its outer end and each connected with the hub by fulcrum pins and each provided on its inner end with teeth or cogs meshing with a pinion arranged in the hub and secured on the axle, a planetary sprocket wheel secured on the opposite end of said axle, a sleeve rotatably mounted on said shaft adjacent to the fly wheel and having secured on its inner end a sprocket wheel connected by a sprocket chain with the sprocket wheel on said axle, said sleeve having its opposite end adapted to be connected with the mechanism the speed of which is to be varied.

The object of our improvements is to provide superior means for increasing or decreasing or for reversing the speed of the propelled mechanism without varying the speed of the engine or other motive power employed, said mechanism being especially adapted for use on automobiles or the like.

Figure 8:
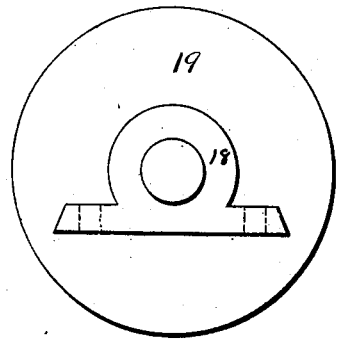
Figure 7:
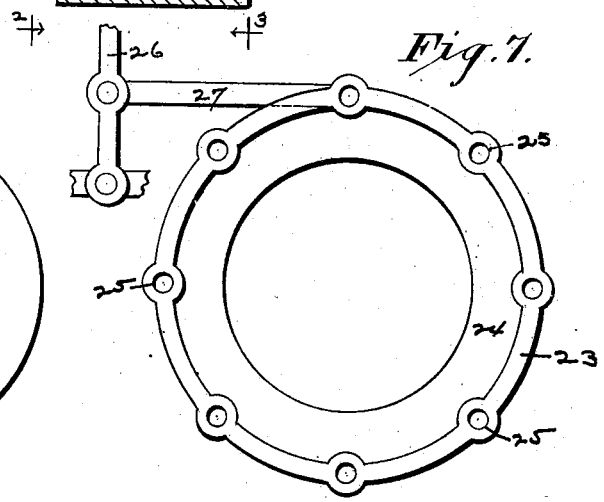
Figure 14:
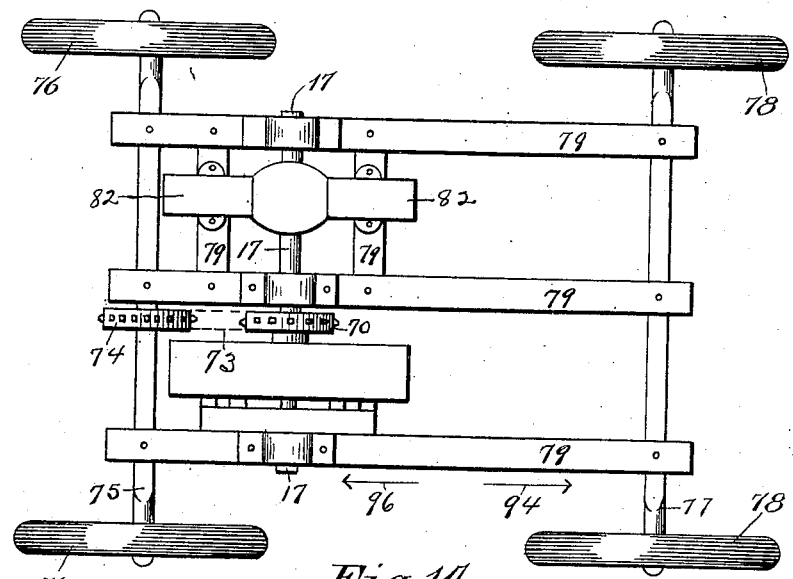
Figure 2:
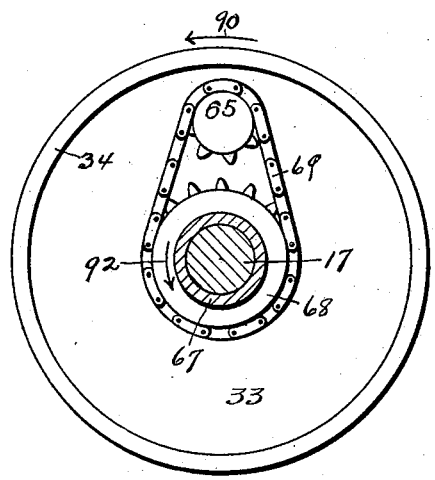
Figure 3:
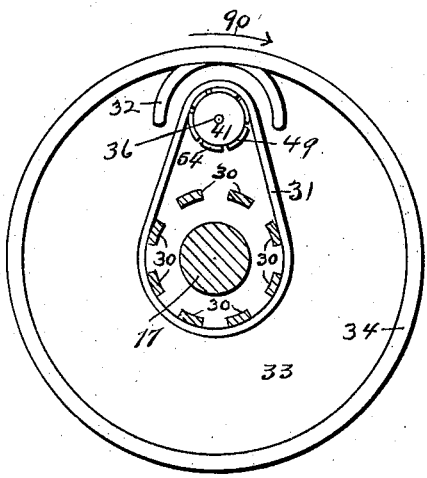
Figure 10:
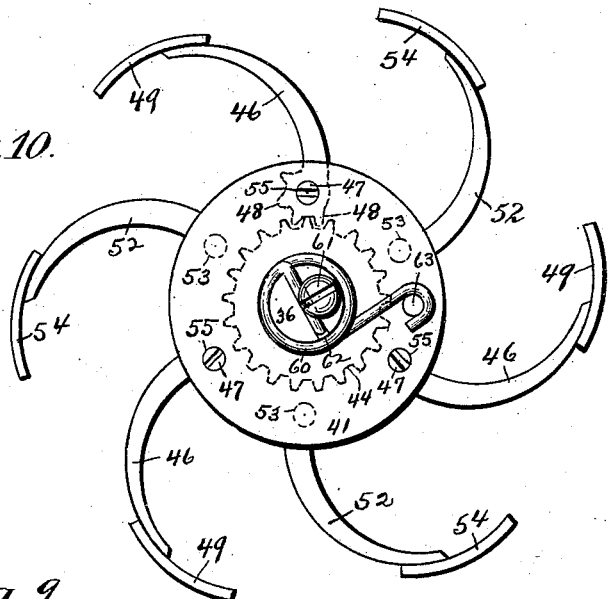
Figure 9:
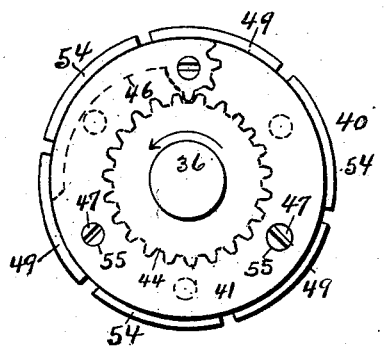
Figure 11:
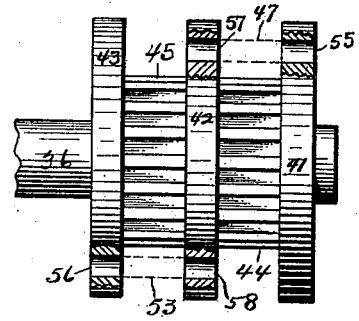
Figure 12:
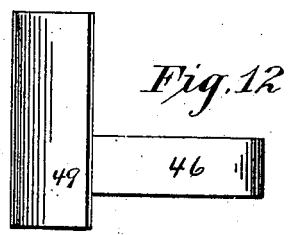
Figure 13:
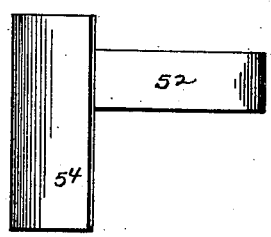

In the drawing—Figure 1 is a longitudinal section of our variable speed and reversing mechanism; Fig. 2 a cross section, on a reduced scale, taken on the line 2—2 of Fig. 1 of the mechanism complete; Fig. 3 a cross section, on a reduced scale, taken on the line 3 of Fig. 1 of the mechanism complete; Fig. 4 an elevation on an enlarged scale, of the inner face of the non-rotatable pulley (contracted), its radial arms, the flanged ring and the circular grooved plate; Fig. 5 an elevation of the inner face of the grooved plate, the flanged ring and one of the radial arms; Fig. 6 a side elevation on an enlarged scale of one of the non-rotatable expansion pulley radial arms; Fig. 7 an elevation of the inner face of the flanged ring; Fig. 8 an elevation of the outer face of the bearing and grooved plate; Fig. 9 an elevation, on an enlarged scale, of the planetary expansive pulley contracted; Fig. 10 an elevation, on an enlarged scale, of the outer end of the planetary expansion pulley expanded and having applied thereto a coil spring for expanding the pulley; Fig. 11 a side elevation of the said pinions and the planetary hub of the expansion pulley with the spokes and fulcrum pins removed therefrom; Fig. 12 a plan of the outer face of a spoke fitting the outer end of said expansion pulley hub; Fig. 13 a plan of the outer face of a spoke fitting the inner end of said expansion pulley hub; and Fig. 14 a top plan view of an automobile frame and engine with our variable speed and reversing mechanism applied thereto.

Referring to the drawings in detail—the reference numeral 17 represents the main shaft adapted to be driven by the motive power employed and having a bearing 18 provided at one end with a flange or circular plate 19 having eight curved grooves 20 formed in its face. Surrounding said plate 19 is a ring 23 having a flange 24 and provided with eight openings 25 and adapted to be partially rotated by any suitable means as a lever 26 and link 27, Fig. 7. Said ring 23 carries eight radial arms 27 provided on their outer ends with pintles 28 arranged in the ring openings 25, and having pins 29 arranged in the grooves 20, and provided on their inner ends with fingers 30 extending parallel with the main shaft and forming the rim of a non-rotatable pulley. Secured on said shaft adjacent to said non-rotatable pulley and rotating with the shaft is a fly wheel 33 having on each side a projecting rim 34 and provided near its rim with an opening 35 to receive the axle 36. Secured on one end of said axle and traveling around said non-rotatable pulley is a planetary expansion pulley 40 comprising: three disks 41, 42, 43 loosely mounted on said axle; a pinion 44 secured on the axle between disks 41 and 42; a pinion 45 secured on the axle between the disks 42 and 43; three spokes 46 arranged between disks 41 and 42 and mounted on fulcrum pins 47 carried by disks 41 and 42, and provided on their inner ends with teeth 48 meshing with the pinion 44, and carrying on their outer ends curved plates 49; and three spokes 52 arranged between the disks 42 and 43 and mounted on the fulcrum pins 53 carried by the disks 42 and 43, and provided on their inner ends with teeth 48 meshing with the pinion 45, and carrying on their outer ends curved plates 54 which, together with said plates 49, form the rim of the said planetary pulley which is adapted to be connected by a belt, indicated by dotted lines 31, Fig. 1, with said non-rotatable pulley.

A single pinion extending from disk 41 to disk 43 may be substituted for pinions 44 and 45 and a ring loosely mounted on the center thereof in place of the disk 42. The disks 41, 42 and 43 together with the pins 47 and 53 constitute the hub of the planetary pulley. Said pins 47 and 53 are inserted respectively in openings 55 and 56 in disks 41 and 43 and have their inner ends secured in openings 57 and 58 in the disk 42.

If the axle 36 be partially rotated in the direction indicated by the arrow in Fig. 9 and the hub held still or moved in the opposite direction, the pulley 40 will be expanded as in Fig. 10, or if the reverse movements take place said pulley will be contracted as in Fig. 9. A coil spring as 62, Fig. 10, or similar means, may be employed to keep said pulley 40 normally expanded. Said spring has one end held, by a screw 61, in a slot 62 formed in the outer end of the axle 36, and has its opposite end connected with the disk 41 by a pin 63. Secured on the opposite end of the axle 36 is a sprocket wheel 65.

Rotatably mounted on the main shaft adjacent to the fly wheel is a sleeve 67 having secured on its inner end a sprocket wheel 68 adapted to be driven by a sprocket chain, indicated by the dotted lines 69, and traveling on said sprocket wheels 65 and 68. Secured on the opposite end of said sleeve is a sprocket wheel 70 adapted to be connected with and to drive the mechanism the speed of which is to be varied, as in Fig. 14, in which said sprocket wheel 70 is connected by a sprocket chain, indicated by dotted lines 73, with a sprocket wheel 74 on the automobile rear axle 75 having wheels 76. Said automobile has also a front axle 77 having wheels 78, and is provided with a frame 79 carrying the main shaft 17 and an engine 82 for driving the main shaft 17.

The operation of our variable speed and reversing mechanism, when applied to an automobile, is as follows: The engine drives the main shaft and rotates the fly wheel in the direction indicated by the arrow 90 in Figs. 2 and 3. Said fly wheel, when rotating, carries the planetary sprocket wheel 65 and the planetary expansion pulley 40 around the sprocket wheel 68 and non-rotatable pulley respectively, whereby the sprocket chain 69 and belt 31 are caused to travel around the sprocket wheel 68 and non-rotatable pulley respectively. The non-rotatable pulley is expanded and contracted by partially rotating the ring 23 which carries the arms 27 the movement of which causes the pins 29 to slide in the grooves 20 whereby the fingers 30 are caused to move nearer to or away from the main axle. In Fig. 5 the arm 27 is shown in the position said arms occupy when the non-rotatable pulley is contracted. If the ring be rotated three sixteenths of a revolution in the direction indicated by the arrow in said Fig. 5 the arms 27 will occupy the position shown by the dotted lines $27^a$, Fig. 5. When the diameter of the non-rotatable pulley is increased the diameter of the planetary pulley proportionately decreases and when the non-rotatable pulley decreases the planetary pulley proportionately increases. If the non-rotatable pulley be so adjusted that its diameter will equal the diameter of the sprocket wheel 68 and so the diameter of the planetary pulley will equal the diameter of the planetary sprocket wheel the fly wheel may be rotated as stated without rotating the sleeve 67 and thus permit the automobile to stand still while the engine and fly wheel are running. If however the non-rotatable pulley is contracted so its diameter is less than the diameter of the sprocket wheel 68 and the planetary pulley larger than the planetary sprocket wheel 22 the sleeve will be rotated in the direction indicated by the arrow 92 in Fig. 2, and the automobile caused to move forward as indicated by the arrow 94, Fig. 14. And the smaller the non-rotatable pulley and the larger the planetary pulley the faster the automobile will run forward. On the contrary, if the non-rotatable pulley be expanded to a larger diameter than the sprocket wheel 68 and the planetary pulley contracted to a smaller diameter than the planetary sprocket wheel the sleeve will be caused to rotate in the opposite direction from that indicated by said arrow 92 and the automobile caused to run backward as indicated by the arrow 96, Fig. 14. If the load be increased when running forward, as in climbing a hill, the belt 31 will tend to expand the planetary pinion and tighten the belt automatically and thereby prevent said belt from slipping when doing its heaviest work. A curved flange 32 may be formed on, or secured to, the fly wheel 33 as shown in Fig. 3 to provide a clutch adapted to partially surround and to engage a portion, preferably more than one half, of the planetary pulley rim, exterior of the belt 31, when said pulley is expanded. If after said clutch engages the planetary pulley, as just stated, the non-rotatable pulley be further contracted the belt will loosen and slip on the latter pulley while the coil spring 60 will tend to further expand the planetary pulley and press the belt tightly against the clutch and hold the latter pulley from rotating, thus relieving the engine of the friction of the belt on its pulleys, the sprocket chain 69 on its sprocket wheels, of the axle in its bearing and of the sleeve on the shaft, thereby permitting the automobile to be run at the full speed and from the direct power of the engine until the planetary pulley be sufficiently contracted, by expanding the non-rotatable pulley, to release it from the clutch.

The belt 31 may consist of any suitable material or materials best adapted for the purpose and the sleeve 67 and automobile rear axle may be connected by gears or other suitable means. The axle 36 and sleeve 67 may also be connected with gears or other suitable means in place of means shown. Furthermore the pulleys may comprise any suitable mechanism which will afford suitable expansion and contraction.

As there are other changes of construction that might be made without departing from the spirit of our invention we do not wish to be confined to the particular construction shown and described.

What we claim as new and desire to secure by Letters Patent, is—

1. In a machine of the character described, a fly wheel and a non-rotatable expansive pulley each having an axis common to both, a rotatable planetary axle having a bearing in said fly wheel, a planetary expansive pulley secured on said planetary axle, a belt traveling on said pulleys, and a clutch carried by the fly wheel and partially surrounding the planetary pulley and adapted when the planetary pulley is suitably expanded to engage that portion of the belt which is between the clutch and the last named pulley for the purpose described.

2. In a machine of the character described, a driven shaft, a non-rotatable expansive pulley surrounding said shaft, a fly wheel secured on the shaft adjacent to the non-rotatable pulley, a rotatable axle having a bearing in the fly wheel and arranged parallel with the shaft, an expansive planetary pulley secured on one end of said axle, a belt connecting said pulleys, and means for connecting the opposite end of the axle with the mechanism the speed of which is to be varied.

3. In a machine of the character described, a fly wheel and a non-rotatable pulley having a common axis, said pulley having a rim composed of sections adapted to dilate and increase the diameter of the rim, a planetary axle having a bearing in the fly wheel, a planetary expansive pulley secured on the axle and traveling around the non-rotatable pulley, and a belt for connecting the pulleys.

4. In a machine of the character described, a shaft adapted to be rotated by any suitable motive power, a fly wheel secured on the shaft, a rotatable planetary axle having a bearing in the fly wheel, a planetary expansive pulley secured on one end of the axle, a non-rotatable pulley arranged near the fly wheel and having a rim composed of movable sections, said non-rotatable pulley and fly wheel having one and the same axis, means for moving the said sections simultaneously whereby the diameter of the rim formed by said sections is contracted and expanded, rotatable means mounted on the shaft near the fly wheel, and means for connecting said rotatable means with the end of the axle opposite the planetary pulley.

5. In a mechanism of the character described, a driven shaft, a fly wheel secured on said shaft, a rotatable axle having a bearing in the fly wheel and extending parallel with the shaft, a pulley secured on the axle near the fly wheel and provided with a sectional rim adapted to be expanded and contracted by the movement of the sections, a non-rotatable pulley arranged near and having the same axis as the fly wheel and provided with a sectional rim adapted to be expanded and contracted by moving its sections, a belt for connecting said pulleys, rotatable means mounted on the shaft near the fly wheel, and means for connecting said rotatable means with the end of the axle opposite the planetary pulley.

6. In a machine of the character described, a rotatable shaft suitably mounted and adapted to be driven by any suitable motive power, a non-rotatable pulley having an expandible and contractible rim surrounding the shaft, a fly wheel secured on the shaft near the non-rotatable pulley, a rotatable axle having a bearing in the fly wheel and arranged parallel with the shaft, a pulley secured on the axle near the fly wheel and having a hub provided with a pinion arranged between disks connected by fulcrum pins carrying swinging spokes having on their ends teeth meshing with the pinion and carrying on their outer ends plates forming the rim of the pulley, means for connecting the pulleys, and means for connecting the opposite end of the axle with the mechanism the speed of which is to be varied.

7. In a machine of the character described, a driven shaft rotatably mounted, a non-rotatable pulley provided with a circular plate having curved grooves formed in its inner face and surrounded by a partially rotatable ring having pivoted thereto radial arms having on their free ends fingers forming the expandible and contractible rim of the pulley and provided between their ends with pins slidably arranged in said grooves, a fly wheel secured on the shaft near said pulley, a rotatable planetary axle extending parallel with the shaft and arranged in a bearing in the fly wheel and having its ends projecting from opposite sides of the fly wheel, and expandible and contractible pulley secured on one end of the axle, a belt connecting the said pulleys, a sprocket wheel secured on the opposite end of the axle, a sleeve rotatably mounted on the shaft near the fly wheel, a sprocket wheel rotatably mounted on the end of the sleeve nearest the fly wheel, a sprocket chain connecting said sprocket wheels, and a sprocket wheel secured on the opposite end of said sleeve and adapted to be connected with the mechanism the speed of which is to be varied.

In testimony whereof we affix our signatures in presence of two witnesses.

EDWARD M. STEINLE.
WILLIAM J. STEINLE.

Witnesses:
O. K. TREGO,
E. C. L. NYE.